(12) United States Patent
Erlich (10) Patent No.: US 12,455,963 B1
(45) Date of Patent: Oct. 28, 2025

(54) SECURITY AND FRAUD PREVENTION FOR WEB ACCESSIBLE RECORDS

(71) Applicant: Roy Erlich, Etz Efraim (IL)

(72) Inventor: Roy Erlich, Etz Efraim (IL)

( * ) Notice: Subject to any disclaimer, the term of this patent is extended or adjusted under 35 U.S.C. 154(b) by 0 days.

(21) Appl. No.: 18/963,614

(22) Filed: Nov. 28, 2024

(51) Int. Cl.
  *G06F 21/55* (2013.01)

(52) U.S. Cl.
  CPC ...... *G06F 21/554* (2013.01); *G06F 2221/034* (2013.01)

(58) Field of Classification Search
  CPC .................. G06F 21/554; G06F 2221/034
  USPC ............................................. 726/23
  See application file for complete search history.

(56) References Cited

U.S. PATENT DOCUMENTS

| | | | | |
|---|---|---|---|---|
| 10,810,357 B1 * | 10/2020 | Tsypliaev | ............ | G06F 3/0484 |
| 10,860,715 B2 * | 12/2020 | Shi | .............. | G06F 21/563 |
| 12,197,591 B1 * | 1/2025 | Oz | .............. | G06F 21/577 |
| 2016/0050210 A1 * | 2/2016 | Nguyen | ......... | H04L 63/0407 726/4 |
| 2017/0366568 A1 * | 12/2017 | Narasimhan | ...... | H04L 63/1425 |
| 2021/0248624 A1 * | 8/2021 | Keren | ............. | G06Q 50/184 |
| 2023/0051123 A1 * | 2/2023 | Domshlak | ........ | G06Q 10/087 |

* cited by examiner

*Primary Examiner* — Dereena T Cattungal (57) ABSTRACT

There is provided a method of applying an automated filtering tool for authenticating server publishing actions, comprising accessing a template web accessible record denoting a web accessible record least likely to be fraudulent and/or to pose a cybersecurity risk, feeding the template web accessible record and the target web accessible record into a machine learning model, obtaining an indication of a statistical correlation between features of the template web accessible record and features of the target web accessible record, and blocking the server from publishing the target web accessible record thereon for being accessible via the WWW when the indication indicates that the target web accessible record is fraudulent and/or posing a cybersecurity risk, or instructing the server to publish the target web accessible record thereon to be accessible via the WWW when the indication indicates that the target web accessible record is non-fraudulent and/or not posing the cybersecurity risk.

23 Claims, 2 Drawing Sheets

SECURITY AND FRAUD PREVENTION FOR WEB ACCESSIBLE RECORDS

BACKGROUND

The present invention, in some embodiments thereof, relates to cybersecurity and, more specifically, but not exclusively, to detection of web accessible record that pose a security risk and/or are fraudulent.

Records accessible to users via the web pose a security risk to the client terminals used by the users and/or to the users themselves. For example, a record may trigger execution of malicious code used to infect the client terminal. In another example, the record may be used to obtain personal information of the user (e.g., phishing attack) which may be used to harm the user.

SUMMARY

According to a first aspect, a computer implemented method of applying an automated filtering tool for authenticating server publishing actions for providing cybersecurity to users accessing web records, comprises: monitoring for an attempt by a server to publish a target web accessible record thereon for being accessible via the world wide web (WWW), accessing a template web accessible record denoting a web accessible record least likely to be fraudulent and/or least likely to pose a cybersecurity risk from a set of existing web accessible records published by the server, feeding the template web accessible record and the target web accessible record into a machine learning model, obtaining from the machine learning model, an indication of a statistical correlation between features of the template web accessible record and features of the target web accessible record, and blocking the server from publishing the target web accessible record thereon for being accessible via the WWW when the indication indicates that the target web accessible record is fraudulent and/or posing a cybersecurity risk, or instructing the server to publish the target web accessible record thereon to be accessible via the WWW when the indication indicates that the target web accessible record is non-fraudulent and/or not posing the cybersecurity risk.

According to a second aspect, a system for cybersecurity for applying an automated filtering tool for authenticating server publishing actions for providing cybersecurity to users accessing web records, comprises: at least one processor executing a code for: monitoring for an attempt by a server to publish a target web accessible record thereon for being accessible via the world wide web (WWW), accessing a template web accessible record denoting a web accessible record least likely to be fraudulent and/or least likely to pose a cybersecurity risk from a set of existing web accessible records published by the server, feeding the template web accessible record and the target web accessible record into a machine learning model, obtaining from the machine learning model, an indication of a statistical correlation between features of the template web accessible record and features of the target web accessible record, and blocking the server from publishing the target web accessible record thereon for being accessible via the WWW when the indication indicates that the target web accessible record is fraudulent and/or posing a cybersecurity risk, or instructing the server to publish the target web accessible record thereon to be accessible via the WWW when the indication indicates that the target web accessible record is non-fraudulent and/or not posing the cybersecurity risk.

According to a third aspect, a non-transitory medium storing program instructions for applying an automated filtering tool for authenticating server publishing actions for providing cybersecurity to users accessing web records, comprising program instructions which when executed by at least one processor, cause the at least one processor to: monitor for an attempt by a server to publish a target web accessible record thereon for being accessible via the world wide web (WWW), access a template web accessible record denoting a web accessible record least likely to be fraudulent and/or least likely to pose a cybersecurity risk from a set of existing web accessible records published by the server, feed the template web accessible record and the target web accessible record into a machine learning model, obtain from the machine learning model, an indication of a statistical correlation between features of the template web accessible record and features of the target web accessible record, and block the server from publishing the target web accessible record thereon for being accessible via the WWW when the indication indicates that the target web accessible record is fraudulent and/or posing a cybersecurity risk, or instruct the server to publish the target web accessible record thereon to be accessible via the WWW when the indication indicates that the target web accessible record is non-fraudulent and/or not posing the cybersecurity risk.

In a further implementation form of the first, second, and third aspects, further comprising dynamically adapting the template web accessible record in real-time to create an updated web accessible record, wherein the updated web accessible record is fed into the machine learning model with the target web accessible record.

In a further implementation form of the first, second, and third aspects, further comprising: identifying at least one feature of the target web accessible record for which the statistical correlation with a corresponding at least one feature of the template web accessible record is below a threshold, and generating a recommendation for adapting the at least one feature of the target web accessible record for increasing the statistical correlation with the corresponding at least one feature of the template web accessible record above the threshold.

In a further implementation form of the first, second, and third aspects, the template web accessible record is at least one of the following relative to the set of existing web accessible records published by the server: most likely to be viewed, most likely to be interacted with by users, most likely to be acted upon by users, highest click-through rate, longest time spent being viewed by users, and highest conversion rate.

In a further implementation form of the first, second, and third aspects, the template web accessible record is generated by analyzing the set of web accessible records posted to the server, as an aggregate of the set of web accessible records representing variability in fraudulency and/or security risk.

In a further implementation form of the first, second, and third aspects, further comprising: identifying a type of the target web accessible record, and selecting the template web accessible record corresponding to the type from a plurality of template web accessible records of different types.

In a further implementation form of the first, second, and third aspects, further comprising: collecting metadata from a computing device used to provide the target web accessible record, associating the metadata with the target web accessible record, wherein feeding comprises feeding the target web accessible record and the associated metadata, wherein the statistical correlation is computed for the metadata of the target web accessible record and the metadata of the template web accessible record, wherein the target web accessible record is removed when the metadata collected from the computing device represents likelihood of the target web accessible record being fraudulent and/or posing a cybersecurity risk.

In a further implementation form of the first, second, and third aspects, the metadata includes at least one of: device type, hardware data, operating system and/or version, browser type and/or version, screen resolution, network information, IP address, Internet Service Provider (ISP), network connection type, geographical location data, user account information, upload details, file size and/or type of uploaded content, image metadata, application-specific data, interaction data, and previous listing history.

In a further implementation form of the first, second, and third aspects, further comprising: accessing an external dataset for obtaining ownership data indicating ownership of an object listed in the target web accessible record, associating the ownership data with the target web accessible record, wherein feeding comprises feeding the target web accessible record and the associated ownership data, wherein the statistical correlation is computed for the ownership data of the target web accessible record and the ownership data of the template web accessible record, wherein the target web accessible record is removed when the ownership data represents likelihood of the target web accessible record being fraudulent and/or posing a cybersecurity risk.

In a further implementation form of the first, second, and third aspects, further comprising: computing a first similarity metric indicating maximal non-similarity between the template web accessible record and other sample web accessible records of the server, computing a second similarity metric indicating similarity between the target web accessible record and sample web accessible records of the server, wherein the statistical correlation is computed between the first similarity metric and the second similarity metric, wherein the target web accessible record is removed when the statistical correlation indicates likelihood of the target web accessible record being fraudulent and/or posing a cybersecurity risk due to high similarity to at least one sample web accessible record.

In a further implementation form of the first, second, and third aspects, further comprising: in response to the indication meeting a requirement indicating inaccurate and/or missing information, identifying the inaccurate and/or missing information in the target web accessible record leading to the indication, automatically correlating the inaccurate and/or missing information to an external dataset, extracting correlated data from the external dataset, automatically correcting the inaccurate and/or missing information, and re-feeding the corrected target web accessible record into the machine learning model.

In a further implementation form of the first, second, and third aspects, further comprising: evaluating the indication relative to a quality threshold indicating a quality threshold to identify reduced quality of the target web accessible record, identifying the features of the target web accessible record leading to the reduced quality, automatically correlating the features to increase quality, and automatically re-feeding the corrected target web accessible record into the machine learning model to determine whether quality of the corrected target web accessible record is above the quality threshold.

In a further implementation form of the first, second, and third aspects, further comprising monitoring for an adaptation of the target web accessible record, and in response to the monitoring, feeding the adapted target web accessible record into the machine learning model.

In a further implementation form of the first, second, and third aspects, the target web accessible record is of a real estate property for sale and/or rent, and the fraudulent and/or cybersecurity risk is of at least one of: the target web accessible record actually being for a real estate property that is different than the real estate property listed in the target web accessible record, the target web accessible record is of a sample real estate property listed in another sample web accessible record on the same server, the real estate property is owned by a different person than the person that is listed as the owner in the target web accessible record, and the target web accessible record indicates a sale by owner while a contact listed on the record is a real estate agent.

In a further implementation form of the first, second, and third aspects, the features of the template web accessible record and features of the target web accessible record include parameters indicating quality of images.

In a further implementation form of the first, second, and third aspects, the parameters indicating quality of images are selected from: image resolution, image size, blurriness, cluster from background objects different than the object associated with the web accessible record, sufficient number of images to cover views of the object.

In a further implementation form of the first, second, and third aspects, the features of the template web accessible record and features of the target web accessible record include parameters indicating quality of text content.

In a further implementation form of the first, second, and third aspects, the parameters indicating quality of context are selected from: correct spelling, correct grammar, sufficient description, vocabulary, and ability to be understood by an average person.

In a further implementation form of the first, second, and third aspects, the template web accessible record is automatically created, evaluated by a ranking process, and automatically adapted to be the highest ranked web accessible record from other sample web accessible records presented on the server.

In a further implementation form of the first, second, and third aspects, the ranking process is selected from: quality, relevance, keyword optimization, user engagement, and compliance with guidelines.

In a further implementation form of the first, second, and third aspects, the features of the template web accessible record and features of the target web accessible record include compliance with guidelines.

In a further implementation form of the first, second, and third aspects, the target web accessible record is removed when the indication is below a threshold indicating that the target web accessible record is fraudulent and/or posing a cybersecurity risk, or posting the target web accessible record to the server when the indication is above the threshold.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to cybersecurity and, more specifically, but not exclusively, to detection of web accessible record that pose a security risk and/or are fraudulent.

An aspect of some embodiments of the present invention relates to computing devices, systems, methods, and/or instructions (stored on a data storage device and executable by one or more processors) for applying an automated filtering tool for authenticating server publishing actions for providing cybersecurity to users accessing web records by analyzing a target web accessible record (also referred to herein as target record) using a template web accessible record (also referred to herein as template record). An attempt by a server to publish a target web accessible record for being accessible via the World Wide Web (WWW) is monitored. For example, a user using a client terminal wishes to upload and/or post the target web accessible record on the server for being accessible to other client terminals via the WWW. A template web accessible record is accessed. The template web accessible record denoting a web accessible record least likely to be fraudulent and/or least likely to pose a cybersecurity risk, for example, relative to a set of web accessible records, which may be the set published by the server. The template web accessible record and the target web accessible record are analyzed, for example, be being fed into a machine learning model. An indication of a statistical correlation between features of the template web accessible record and features of the target web accessible record is obtained, optionally from the machine learning model. The server is blocked from publishing the target web accessible record thereon for being accessible via the WWW when the indication indicates that the target web accessible record is fraudulent and/or posing a cybersecurity risk. Alternatively, the server is instructed to publish the target web accessible record thereon to be accessible via the WWW when the indication indicates that the target web accessible record is non-fraudulent and/or not posing the cybersecurity risk.

At least one embodiment described herein enables detecting fraudulent and/or cybersecurity risks which are difficult to detect using existing methods. For example, by running malware detection software, and/or scanning phone numbers and/or email addresses of the target web accessible record to detect known fraudulent phone numbers and/or known fraudulent email addresses.

Examples of target web accessible records and fraudulent and/or cybersecurity risk which may be detected using embodiments described herein and may be difficult to detect using existing approaches include:

The target web accessible record is of a real estate property for sale and/or rent. The fraudulent and/or cybersecurity risk may be that the target web accessible record actually being for a real estate property that is different than the real estate property listed in the target web accessible record The target web accessible record is of a sample real estate property listed in another sample web accessible record on the same server. The fraudulent and/or cybersecurity risk may be that the real estate property may be owned by a different person than the person that is listed as the owner in the target web accessible record.

The target web accessible record indicates a sale by owner. The fraudulent and/or cybersecurity risk may be that a contact listed on the record is a real estate agent rather than the owner.

At least one embodiment described herein addresses the technical problem of detecting whether a target web accessible record, which is posted and/or designated to be posted, on a server for being accessible to client terminals via the WWW, poses a security risk and/or is fraudulent. At least one embodiment described herein improves the technology of tools for cybersecurity, by providing an approach for determining whether a target web accessible record, which is posted and/or designated to be posted, on a server for being accessible to client terminals via the WWW, poses a security risk and/or is fraudulent. At least one embodiment described herein improves upon prior approach for determining whether a target web accessible record, which is posted and/or designated to be posted, on a server for being accessible to client terminals via the WWW, poses a security risk and/or is fraudulent. At least one embodiment described herein provides the practical application of blocking the server from publishing the target web accessible record or instructing the server to publish the target web accessible record, according to the outcome of an analysis of whether or not the target web accessible record is fraudulent and/or poses a cybersecurity risk.

Target web accessible records, for example, buy/sell posts, advertisements, social media posts, blog entries, and the like, may pose a cybersecurity risk and/or be fraudulent, while posing as an innocuous record. Users browsing and/or accessing web accessible records using their client terminal may unknowingly expose themselves to cybersecurity risk and/or fraud. For example, when looking for a property to buy/rent, a user may click on a link to view images of the property, which may trigger a download of malicious content. Client terminals of users may undergo malicious attack via the target web accessible record. In more sophisticated records, a sell listing for a property by an owner may be fraudulently be posted by a realtor which seeks to obtain a commission. In yet other records, a sell listing for a certain item which is known to be popular may list a phone number for a person which is trying to sell a different item which may not be popular and/or may be overpriced. Users may be fraudulently lured into financial transactions they had no intent on performing.

Existing approaches to optimize records (e.g., ad listings) and/or for safeguarding platforms (e.g., e-commerce) may involve a combination of manual content review, user reporting, basic keyword filters, fixed data validation rules, and/or one-time fraud checks. Manual content review may enables human moderators to assess and/or enrich ad listings for accuracy and relevance, although it may not scale efficiently. User reporting may empower the community to flag fraudulent or misleading ads, which may allow the platform to reactively address issues. Basic keyword filters can automatically detect and block ads containing prohibited or suspicious terms, providing a first line of defense against inappropriate content. Fixed data validation rules may be used to help ensure that all mandatory fields are correctly filled and adhere to the required formats, maintaining data integrity without deep content analysis. One-time fraud checks at the point of ad submission help in initially identifying fraudulent activities, but they lack ongoing monitoring to catch evolving fraud tactics.

At least one embodiment described herein provides a solution for the aforementioned technical problem, and/or improves upon the aforementioned technical field, and/or improves upon the aforementioned technical approaches, and/or provides the aforementioned technical application, by using a template web accessible record to analyze the target web accessible record for determining whether the target web accessible record poses a security risk and/or is fraudulent.

The target web accessible record may be analyzed, for example, be being fed into a machine learning model in combination with the template web accessible record. An indication of a statistical correlation between features of the template web accessible record and features of the target web accessible record is obtained, optionally from the machine learning model. The server is blocked from publishing the target web accessible record thereon for being accessible via the WWW when the indication indicates that the target web accessible record is fraudulent and/or posing a cybersecurity risk. Alternatively, the server is instructed to publish the target web accessible record thereon to be accessible via the WWW when the indication indicates that the target web accessible record is non-fraudulent and/or not posing the cybersecurity risk.

The template web accessible record may represent a "Perfect Record", in terms of being least likely to pose a cybersecurity risk and/or be fraudulent. Alternatively or additionally, the template web accessible record may represent the "Perfect Record" in terms of a record most likely to be accessed by users and/or most likely to be acted upon by users, for example, a buy/sell listing and/or advertisement which receives the highest number of views and/or the highest number of users purchasing the property and/or item.

The template web accessible record may be dynamically updated, where for each target web accessible record being analyzed, the most recent and/or relevant dynamic template web accessible record is used.

Creating and/or defining a dynamic "Perfect Record" template and comparing new target web accessible records to the template web accessible record provides significant potential advantages over standard approaches, in particular over standard machine learning approaches that rely on static training data for learning classification. Rather than training the machine learning model on defined template web accessible records, which requires updating of the machine learning model as templates web accessible records are updated, the machine learning model may be trained on analyzing the template web accessible record with respect to the target web accessible record, where the training is on the analysis, rather than on the template record. Thus, once trained, the ML model may be used for analyzing dynamically updated template records in its current version, without requiring updating of the ML model.

The dynamically adapted template web accessible record may provide real-time adaptability where the "Perfect Record" evolves, for example, with respect to the current market trends, user behaviors, and/or emerging fraud and/or security patterns, without the need for retraining the machine learning model. The approach may provide granular feedback by evaluating each aspect and/or feature of the target record against the template record, which may provide users with specific and/or actionable insights for optimizing their record a feature which standard ML models, with their limited outputs, cannot provide.

Moreover, at least one embodiment enables proactive fraud and/or security risk detection by integrating security factors into the template record, allowing for immediate identification of unusual patterns and/or deviations. In contrast, standard ML approaches depend on historical data and may fail to recognize new fraud types promptly. At least one embodiment may further provide a holistic evaluation by simultaneously assessing multiple dimensions and/or features of a record, for example, content quality, completeness, engagement potential, and compliance—which standard ML models cannot do because such ML models focus on singular outcomes. The approach described herein of comparing the target web accessible record to the template web accessible record overcomes the limitations of standard ML algorithms by providing a dynamic, detailed, and comprehensive solution for optimization of target records and/or fraud prevention for target records.

The target web accessible record represent a "Perfect Record" template may be implemented as a dynamic, high-level framework that defines the optimal attributes for web accessible records. The target web accessible record is necessarily not just a single regular web accessible record designated as a template but rather a composite model derived from analyzing successful web accessible records across various types, for example, categories. The template record may outline key factors such as content quality, keyword usage, image standards, pricing strategies, and compliance requirements. The template record may serve as a benchmark against which new target records are compared to identify areas for enhancement.

In some embodiments, the template record may be designed to include multiple variations, for example, to cater to different categories, geographical regions, and/or record formats. In such embodiments, rather than defining a single template record, a set of template records customized to reflect the unique characteristics of each segment are defined, for example, where records are for items being sold online, separate template records for electronics, real estate, or fashion. These variations may help ensure that the guidance provided is relevant and/or effective for the specific type of target record, which may offer a more personalized optimization process rather than a one-size-fits-all approach.

At least some embodiments address the technical problem arising by platforms (e.g., e-commerce) optimizing listings (e.g., records describes herein) for maximum performance while ensuring data integrity and/or preventing fraud. Manually enriching listings with accurate, relevant information and benchmarking them against evolving standards is labor-intensive and difficult to scale. Additionally, fraudulent or misleading listings pose substantial risks to user trust and the platform's reputation. At least some embodiments described herein provide an automated, scalable solution that integrates AI-driven analysis for optimization, robust data validation, and continuous fraud detection and/or prevention to enhance listing effectiveness and safeguard the platform.

At least some embodiments provide a robust, data-driven framework for listing creation and optimization that leverages artificial intelligence and cybersecurity processes. This framework integrates matching, correlation detection, data enrichment, and processing to ensure that listings are accurate, competitive, and fraud-free. Through classification, filtering, and ranking, the platform continually refines its listings while implementing ongoing fraud detection and prevention mechanisms. This approach ensures efficient listing delivery and secure marketplace interactions.

At least some embodiments described herein relate to an AI-driven solution that potentially offers significant improvements over existing solutions (e.g., as described herein) for optimizing record (e.g., ad listings) and/or safeguarding a platform (e.g., e-commerce). Existing solutions are based on manual content reviews, user reporting, basic keyword filters, fixed data validation rules, and/or one-time fraud checks. While these approaches provide a basic level of oversight, they are labor-intensive, not scalable, and often reactive rather than proactive. They lack adaptability to evolving fraud tactics and do not offer continuous monitoring or optimization, which can result in inefficient record performance and/or increased vulnerability to fraudulent activities.

In contrast, at least some embodiments described herein (e.g., relating to an AI-driven solution) leverage advanced machine learning and/or automation to address the aforementioned shortcomings effectively. At least some embodiments relate to automated data enrichment, record analysis, fraud detection, and/or continuous optimization, allowing for real-time responsiveness and scalability. In at least some embodiments the AI models described herein provide personalized recommendations to enhance ad quality and/or use anomaly detection to adapt to new fraud patterns proactively. This potentially results in improved record performance, enhanced user trust, and/or a more secure platform, which may provide offering a technical advantage over the traditional methods employed in the existing solutions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
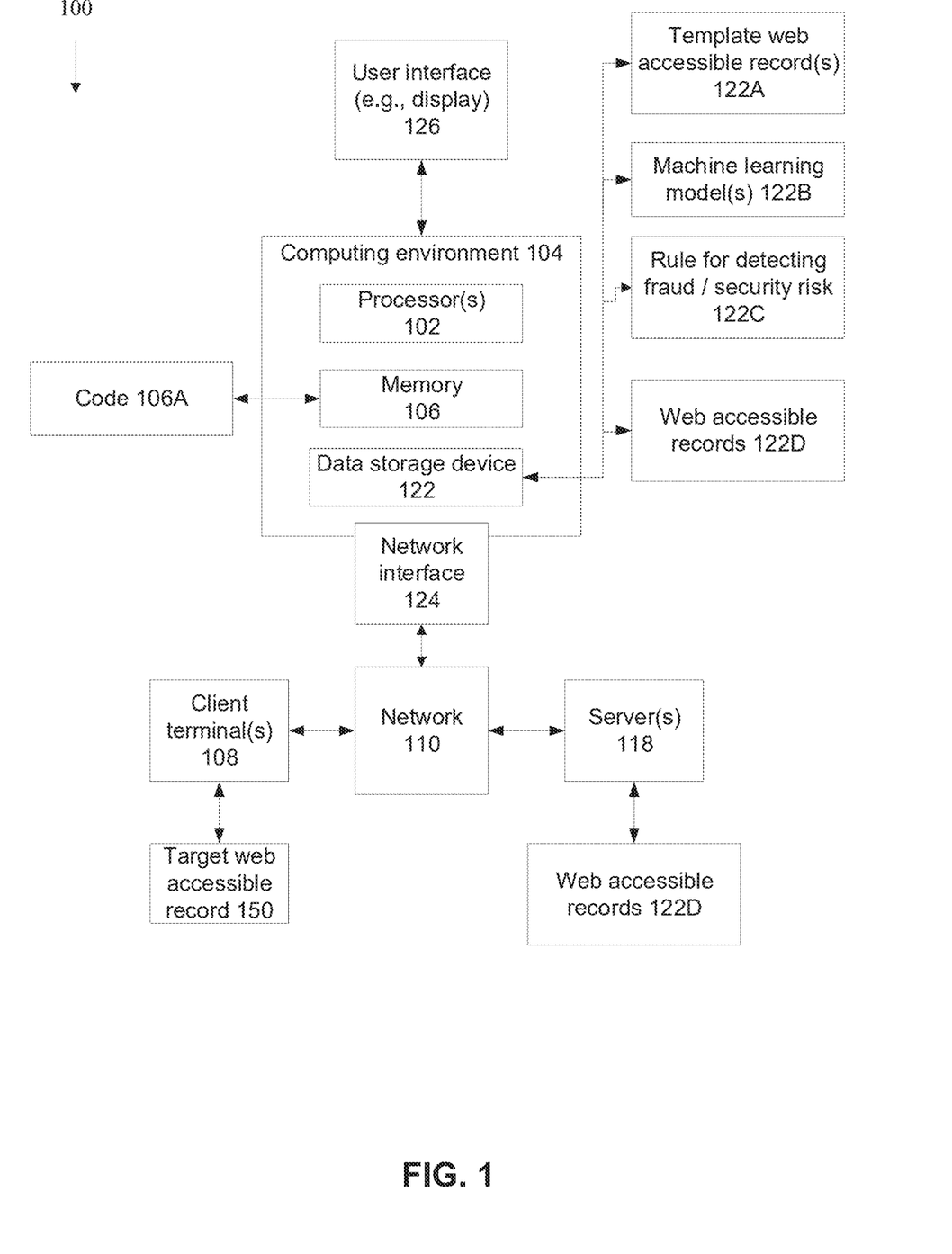
FIG. 1 is a block diagram of components of a system for applying an automated filtering tool for authenticating server publishing actions for providing cybersecurity to users accessing web records based on a template web accessible record, in accordance with some embodiments of the present invention.
Figure 2:
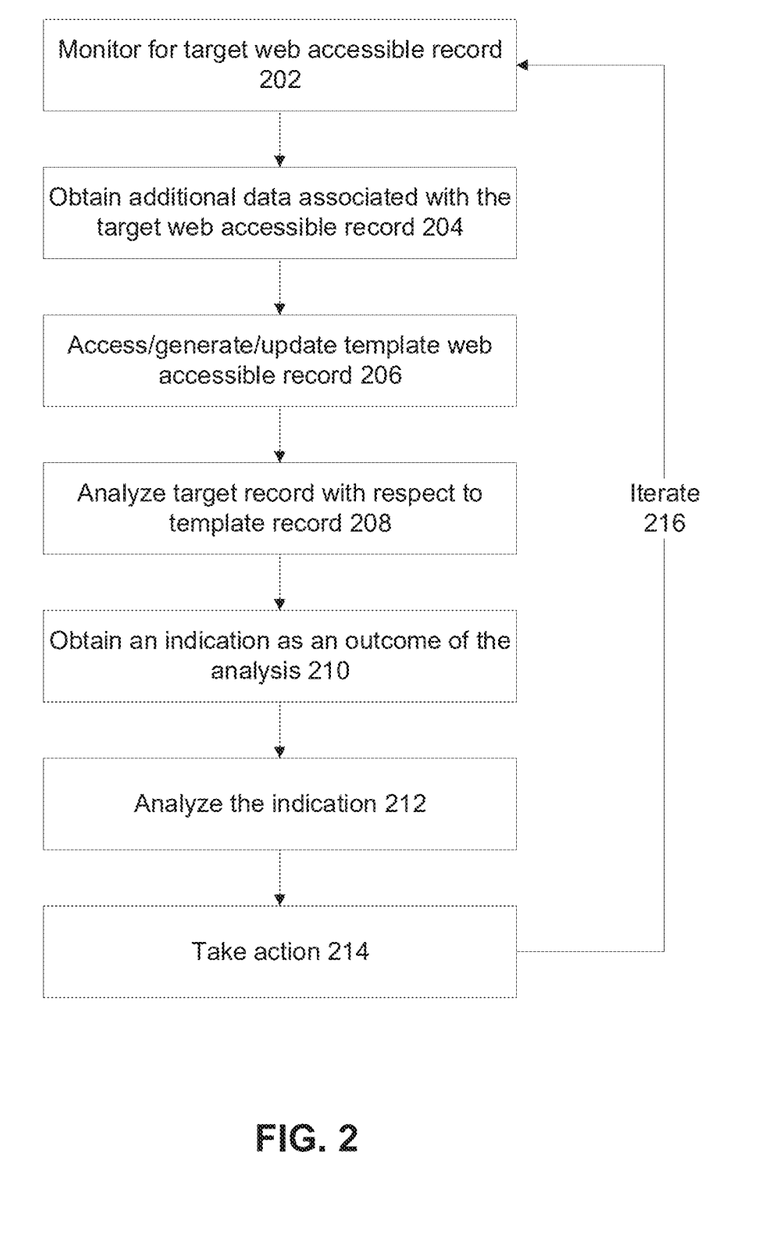
FIG. 2 is a flowchart of a method of applying an automated filtering tool for authenticating server publishing actions for providing cybersecurity to users accessing web records based on a template web accessible record, in accordance with some embodiments of the present invention.

Reference is now made to FIG. 1, which is a block diagram of components of a system 100 for applying an automated filtering tool for authenticating server publishing actions for providing cybersecurity to users accessing web records 122D based on a template web accessible record 122A, in accordance with some embodiments of the present invention. Reference is also made to FIG. 2, which is a flowchart of a method of applying an automated filtering tool for authenticating server publishing actions for providing cybersecurity to users accessing web records based on a template web accessible record, in accordance with some embodiments of the present invention. System 100 may implement the acts of the method described with reference to FIG. 2, by processor(s) 102 of a computing environment 104 executing code instructions stored in a memory 106 (also referred to as a program store).

Computing environment 104 applies an automated filtering tool (e.g., code 106A) for authenticating server publishing actions for providing cybersecurity to users accessing web records 122D based on a template web accessible record 122A, as described herein.

Computing environment 104 may be implemented as, for example one or more and/or combination of: a group of connected devices, a client terminal, a server, a web server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing environment 104 may be implemented. For example:

Computing environment 104 executing stored code instructions 106A, may be implemented as one or more servers (e.g., network server, web server, a computing cloud, and a virtual server) that provides centralized services (e.g., one or more of the acts described with reference to FIG. 2). Services may be provided, for example, to one or more client terminals 108 over network 110, and/or to one or more server(s) 118 over network 110. Server(s) 118 may include, for example, web servers that host websites and/or social network from which web accessible records(s) 122D may be accessed, and/or data storage servers that store data including web accessible records (s) 122D, which are accessed and/or downloaded by client terminals. Services may be provided to client terminals 108 and/or server(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or server(s) 118, and/or providing functions using a remote access session to the client terminals 108 and/or server(s) 118, such as through a web browser executed by client terminal 108 and/or server(s) 118 accessing a web sited hosted by computing environment 104. For example, target web accessible record(s) 150 are provided from one or more client terminal 108 for posting on server(s) 118 (e.g., to web accessible records 122D). Computing environment 104 centrally analyzes the target web accessible record(s) 150 (as described herein) for determining whether the target web accessible record(s) 150 poses a cybersecurity risk and/or is fraudulent. When the target web accessible record(s) 150 is determined to be non-fraudulent and/or to not pose a cybersecurity risk, the target web accessible record(s) 150 may be posted to web accessible records 122D hosted by server(s) 118.

Computing environment 104 may be implemented for local execution (i.e., include locally stored code instructions 106A) of one or more of the acts described with reference to FIG. 2, for locally determining whether target web accessible record(s) 150 poses a cybersecurity risk and/or is fraudulent. When the target web accessible record(s) 150 is determined to be non-fraudulent and/or to not pose a cybersecurity risk, the target web accessible record(s) 150 may be posted to web accessible records 122D hosted by computing environment 104. The locally stored code instructions 106A may be obtained from a server, for example, by downloading the code over the network, and/or loading the code from a portable storage device. Target web accessible record(s) 150 may be obtained, for example, uploaded by a user via client terminal 108, stored by a data storage device such as by a server(s) 118, by a user manually entering a path where target web accessible record (s) 150 is stored, intercepting target web accessible record (s) 150 being transferred by user(s) across a network, and/or a user activating an application that automatically analyzes target web accessible record(s) 150 stored on computing environment 104 and/or accessed by computing environment 104 (e.g., over a network 110, and/or stored on a data storage device 122).

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by hardware processor(s) 102.

Computing environment 104 may include a data storage device 122 for storing data, such as one or more code based processes described herein, for example, template web accessible record(s) 122A used to determine whether target web accessible record 150 poses a cybersecurity risk and/or is fraudulent, machine learning model 122B that analyzes target web accessible record 150 in view of template web accessible record(s) 122A, rules for detecting fraud and/or security risk 122C used to analyze the outcome of the machine learning model and/or used to determine whether target web accessible record 150 in view of template web accessible record 122A poses a security risk and/or is fraudulent, and/or web accessible records 122D representing published web accessible records which have been analyzed and determined to not pose a cybersecurity risk and/or are non-fraudulent, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 and/or client terminal(s) 108 include and/or are in communication with one or more physical user interfaces 126 that include a mechanism for a user to enter data (e.g., manually designate the location of target web accessible(s) 150 for analysis) and/or view the displayed results (e.g., presentation of results of whether target web accessible record 150 is determined to be a cybersecurity risk and/or fraudulent), within a GUI. Exemplary user interfaces 126 include, for example, one or more of, a touchscreen, a display, gesture activation devices, a keyboard, a mouse, and voice activated software using speakers and microphone.

Referring now back to FIG. 2, at 202, monitoring is performed to detect an attempt by a server to publish a target web accessible record thereon for being accessible via the WWW.

Examples of target web accessible records include: online listings for properties to buy/sell/rent, advertisements posted on online platforms, and profiles on social network platforms. Examples of attempts to publish the target web accessible record by the server include: a client terminal used by a user uploads an online listing for a property they wish to sell to an online real estate platform. In another example, the server may pose an advertisement is received for posting from another server and/or client terminal, for example, on an online newspaper. In yet another example, a user uses a web browser to post an online blog on a social network platform.

At 204, additional data associated with the target web accessible record may be obtained.

The additional data is associated with the target web accessible record.

Optionally, the additional data includes metadata obtained from a computing device used to provide the target web accessible record, for example, a client terminal of the user uploading and/or posting the target web accessible record. Examples of metadata obtained from the computing device include: device type, hardware data, operating system and/or version, browser type and/or version, screen resolution, network information, IP address, Internet Service Provider (ISP), network connection type, geographical location data, user account information, upload details, file size and/or type of uploaded content, image metadata, application-specific data, interaction data, and previous listing history.

Alternatively or additionally, the additional data includes ownership data indicating ownership of an object listed in the target web accessible record. The ownership data may be obtained, for example, from an external dataset, such as government records indicating registered owners (e.g., of real estate, of cars), and the like.

Alternatively or additionally, the additional data includes user-provided content, for example, titles, descriptions (e.g., text), images, and the like.

At 206, a template web accessible record is accessed.

The template web accessible record may be a dynamic benchmark initially crafted through manual reviews of effective templates (e.g., where effectiveness may be defined using different metrics), serving as a foundation for automated adaptation and/or automated improvement. Over time, less manual input may be used, allowing for autonomous refinement and/or defining metrics for the template web accessible record, which may help ensure continuous optimization.

The template web accessible record may be dynamically adapted in to create an updated web accessible record. The update may be done, for example, in real time, in response to newly available updates, periodically (e.g., once a day, once a week), and the like.

The template web accessible record may defined be relative to other web accessible records, such a set of existing web accessible records, which may be the set published by the server. Alternatively, the template web accessible record is defined as an absolute standard without being defined relative to other web accessible records.

The template web accessible record may denote a web accessible record least likely to be fraudulent and/or least likely to pose a cybersecurity risk. Individual features and/or combinations of features of the template web accessible record may be unlikely to be found in record that are fraudulent and/or pose a cybersecurity risk. For example, records that are fraudulent and/or pose a cybersecurity risk may post low resolution images and/or provide vague descriptions, while the template record may include high resolution images and/or provide specific detailed descriptions.

Alternatively or additionally, the template web accessible record may denote a web accessible record which has one or more properties. The template web accessible record may be defined as being least likely to depict the property, or most likely to depict the property, relative to the set of existing records which may be the set published by the server. Examples of properties include: engagement by users, most likely to be viewed, most likely to be interacted with by users, most likely to be acted upon by users, highest click-through rate, longest time spent being viewed by users, and highest conversion rate.

Optionally, the template web accessible record is selected from multiple defined template web accessible records. The template web accessible record may be selected according to a type that corresponds to the type of the target web accessible record. Each of the multiple defined template web accessible records may represent a different type. The type of the target web accessible record may be identified, for example, based on manual user input (e.g., category where the target web accessible record is to be posted), based on a field of the target web accessible record, based on an analysis of content of the target web accessible record, and the like.

Additional data may be accessed and/or generated and/or updated for the template web accessible record. The additional data associated with the template web accessible record may correspond to the additional data associated with the target web accessible record.

The template web accessible record may be automatically generated based on an analysis of multiple web accessible records, optionally web accessible records published by the server. The template web accessible record may be automatically generated based on an aggregation of the multiple web accessible records. For example, each web accessible record may be associated with an indication of fraud, security risk, and/or one or more other properties described herein. Each indication may be, for example, a value within a range, a classification category, a binary value, and the like. The template web accessible record may represent an optimal and/or minimal and/or maximal value of the fraud and/or security risk and/or one or more properties.

The template web accessible record may be evaluated to help ensure it correctly represents the record least likely to be fraudulent and/or least likely to pose a cybersecurity risk and/or one or more of the other properties described herein. The automatic evaluation may be performed by a ranking process, which may rank the template record with respect to other records, such as other records hosted by the server. When the ranking process assigns a rank to the template record that is higher than the other records with respect to being fraudulent and/or posing a cybersecurity risk, the template may be determined to be least likely to be fraudulent and/or posing a cybersecurity risk. When the ranking process assigned a rank to the template record that is less than other records, the template record may be automatically adapted to be the highest ranked web accessible record from other sample web accessible records hosted by the server. The automatic adaptation may be performed, for example, by random changes and trial and error, based on a heuristic approach that iteratively changes the template record in an attempt to obtain highest ranking (e.g., gradient descend), by a machine learning model trained to adapt the template record with respect to other records to be ranked higher, and the like. The ranking process may perform the ranking based on one or more of: quality, relevance, keyword optimization, user engagement, and compliance with guidelines.

At 208, the target record is analyzed with respect to the template record.

Alternatively, the additional data associated with the target record is analyzed with respect to the additional data associated with the template record. Alternatively, a combination of the additional data (e.g., metadata, ownership data) associated with the target record and the target record, is analyzed with respect to the template record.

The analysis may be performed by feeding the template web accessible record and the target web accessible record into a machine learning model. The feeding may be of the additional data associated with the target record, or combination of the target record and the additional data, with the additional data associated with the template record, or combination of the template record and the additional data.

Alternatively or additionally, the analysis may be performed using other approaches, for example, computing statistical distances such as Euclidean distances, between individual features and/or combinations of features extracted from the target web accessible record and from the template web accessible record.

The statistical distance and/or correlation may be computed for features, which may be extracted, for example, by feature extraction code, by feeding into an encoding neural network, by feeding into an encoder process, and the like. The machine learning model may explicitly or implicitly extract the features from the fed records and/or the additional data. Alternatively, the features are extracted and fed into the machine learning model.

Optionally, the features of the template web accessible record and features of the target web accessible record include parameters indicating quality of images. Examples of parameters indicating quality of images include: image resolution, image size, blurriness, cluster from background objects different than the object associated with the web accessible record, and sufficient number of images to cover views of the object.

Alternatively or additionally, the features of the template web accessible record and features of the target web accessible record include parameters indicating quality of text content. Examples of parameters indicating quality of content are selected from: correct spelling, correct grammar, sufficient description, vocabulary, and ability to be understood by an average person.

Alternatively or additionally, the features of the template web accessible record and features of the target web accessible record include compliance with guidelines.

Alternatively or additionally, the analysis is performed to determine whether the target record is closely similar to other existing records. Similarity to other existing records may indicate a duplicate of another existing record, which may be associated with a security risk and/or fraud. Similarity between the target record and one or more other existing records may be computed by computing features that include a first similarity metric and a second similarity metric. The statistical correlation may be computed between the first similarity metric and the second similarity metric using approaches described herein. The first similarity metric may indicate maximal non-similarity between the template web accessible record and other sample web accessible records of the server. The second similarity metric may indicate similarity between the target web accessible record and sample web accessible records of the server.

Alternatively or additionally, the analysis may be performed using Natural Language Processing (NLP) for analyzing text of the target record such as titles and/or descriptions relative to the template record for quality and relevance, for enhancing keyword optimization and/or user engagement.

Alternatively or additionally, the analysis may be performed using computer vision techniques for assessing and/or improving image quality of the target record relative to the template record, for ensuring compliance with platform guidelines.

Alternatively or additionally, the analysis may be performed for the target record relative to the template record using anomaly detection tools and/or deep learning models to identify fraudulent activities by recognizing complex patterns and behavioral anomalies. Clustering may be performed to get groups of similar ads records market analysis and duplicate detection.

At 210, an outcome of the analysis is obtained.

The outcome may be obtaining from the machine learning model. The outcome may be an indication of a statistical correlation between features of the template web accessible record and features of the target web accessible record. The statistical correlation may be computed for the additional data (e.g., metadata, ownership data) of the target web accessible record, and the additional data (e.g., metadata, ownership data) of the template web accessible record. The statistical correlation may be computed as a numerical value. Alternatively, the statistical correlation may be computed as a classification category, for example, a binary category indicating a security risk/fraud, or not a security risk/fraud.

Alternatively or additionally, the outcome is obtained from another process, such a process that computes the statistical distance described herein.

At 212, the outcome, optionally the indication of statistical correlation, may be analyzed.

The outcome may be analyzed using a set of rules. Optionally, the outcome, such as indication of statistical correlation, is analyzed with respect to a threshold, to determine whether the indication is above the threshold (e.g. indicating significant statistical correlation) or below the threshold (e.g., indicating non-significant correlation). The threshold may be used to differentiate, for example, between fraud and not fraudulent, posing a cybersecurity risk and not posing a cybersecurity risk, and one or more properties (described herein) being significantly met or not being significantly met.

Alternatively or additionally, the outcome may be for the additional data (e.g., metadata collected from the computing device, ownership data). The analysis may indicate that the additional data (e.g., metadata collected from the computing device, ownership data) represents likelihood of the target web accessible record being fraudulent and/or posing a cybersecurity risk.

At 214, action may be taken according to the analysis of the indication.

Action may be taken for a new target web accessible record which has not yet been published by the server, for example, a user wishes to post and/or upload the target web accessible record to the server:

Optionally, in response to the analysis indicating that the target web accessible record is fraudulent and/or posing a cybersecurity risk, the server may be blocked from publishing the target web accessible record thereon for being accessible via the WWW. For example, instructions are generated for the server to block the publication, instructions to publish are ignored, instructions to publish are not generated, and the like.

Alternatively, in response to the analysis indicating that the target web accessible record is non-fraudulent and/or not posing the cybersecurity risk, the server may be instructed to publish the target web accessible record thereon to be accessible via the WWW. For example, instructions are generated for the server to proceed with the publication, instructions to publish are implemented, instructions to publish are generated, and the like. The location where the target web accessible record is posted may be determined, for example, by content quality, completeness, and potential for user engagement.

Action may be taken for an existing target web accessible record which has previously been published by the server, for example, the existing target web accessible record has not yet been analyzed, the existing target web accessible record has been modified (e.g., by a user), and the like. Optionally, in response to the indication being below a threshold indicating that the target web accessible record is fraudulent and/or posing a cybersecurity risk, the target web accessible record may be removed from being accessible via the WWW, for example, deleted, changing a status to non-accessible, and the like.

Alternatively, in response to the indication being below the threshold, the existing target web accessible record may remain accessible, for example, no changes to the status, and/or flagging the existing target web accessible record as "safe", and the like.

Optionally, in response to the analysis of the statistical correlation indicating likelihood of the target web accessible record being fraudulent and/or posing a cybersecurity risk due to high similarity to at least one sample web accessible record, the target web accessible record may be removed and/or not published and/or otherwise made inaccessible. The sample web accessible record may be an existing web accessible record published by the server. Similarity of the target web accessible record to the existing web accessible record may indicate fraud, such as a user attempting to post two records for the same thing (which may be not allowed according to guidelines), one user trying to impersonate another user's record to lure others away from the other user's record to their record, and the like.

Optionally, in response to the analysis indicating that the target web accessible record includes inaccurate and/or missing information, the inaccurate and/or missing information in the target web accessible record leading to the indication may be identified. For example, the content of the target web accessible record may be fed into a large language model that is prompted to look for inaccurate and/or missing information. In another example, features of the target web accessible record that are significantly non-correlated with features of the template web accessible record may be identified. The data associated with the non-correlated features may be identified and analyzed to identify the missing and/or inaccurate information.

Optionally, the inaccurate and/or missing information is automatically corrected. The automatic correction may be performed by automatically correlating the inaccurate and/or missing information to an external dataset, for example, a website hosted by a server, results of a search engine, and the like. Correlated data from the external dataset may be extracted. The inaccurate and/or missing information may be automatically corrected using the data from the external data. The corrected target web accessible record may be re-analyzed, to help ensure that the corrections are satisfactory, by re-analyzing the corrected target web accessible record with respect to the template web accessible record, such as by re-feeding the combination of the corrected target web accessible record and the template web accessible record into the machine learning model. For example, when the target web accessible record is a real-estate listing for a property, a phone number of the real estate agent may be identified as missing. The phone number may be found, for example, by searching the internet, and/or accessing the website of the real-estate office that the real estate agent works with.

Optionally, the quality of the target web accessible record is automatically improved. The analysis of the indication may be performed by evaluating the indication relative to a quality threshold indicating quality to identify reduced quality of the target web accessible record. Features of the target web accessible record leading to the reduced quality may be identified, for example, by identifying features of the target web accessible record that are non-correlated with quality features of the template web accessible record. The identified features of the target web accessible may be automatically adapted to improve quality. The corrected target web accessible record may be automatically re-analyzed to determine whether quality of the corrected target web accessible record is above the quality threshold. The corrected target web accessible record with improved quality may be re-analyzed with respect to the template web accessible record, such as by re-feeding the combination of the corrected target web accessible record and the template web accessible record into the machine learning model.

Optionally, a feature(s) of the target web accessible record for which the statistical correlation with a corresponding feature(s) of the template web accessible record meeting a requirement (e.g., is below a threshold) is identified. The requirement may be for one or more properties described herein. A recommendation for adapting the feature(s) of the target web accessible record for increasing the statistical correlation with the corresponding feature(s) of the template web accessible record above the threshold may be automatically generated. The recommendation may be for improving one or more of the properties described herein. The recommendation may be presented to a user, such as on a display of the client terminal of the user. The recommendation may be implemented as, for example, text, a video, an image, an animation, audio, and the like. For example, the recommendation is to add additional specific details of an item being sold to increase the click-through rate. In another example, the recommendation may be to add a video of a walk-through of a property for sale in order to improve the final sale price.

Optionally, a recommendation for adaptation and/or automatic adaptation of the target web accessible record is generated, for increasing ranking of the target web accessible record. For example, ranking in terms of one or more criteria such as content quality, engagement metrics, and compliance with platform standards.

At 216, one or more features described with reference to 202-214 may be automatically iterated.

The iterations may be performed by monitoring for an adaptation of the target web accessible record, for example, by a user adapting an existing published target web accessible record, which may have previously been posted after successfully passing a preceding iteration that did not detect risk of fraud and/or cybersecurity risk. One or more features described with reference to 202-214 may be iterated for analyzing the adapted target web accessible record, such as to determine whether the adapted target web accessible record represents a security risk and/or fraud.

Underperforming records such as low ranked records (e.g., one or more properties described herein are below a threshold) may be re-analyzed and adapted (e.g., fine-tuned) to increase their performance, such obtaining higher ranking, by the iterations.

An integrated technological approach may be used to create a dynamic framework that continuously refines record quality, maximizes user engagement, and/or proactively prevents fraud.

The following Table 1 provides examples of some code processes for implementing one of more features described with reference to FIG. 2:

TABLE 1

| Code process | Description | Recommended Technologies |
| --- | --- | --- |
| Data Collection, Preprocessing, and Enrichment | Handles data ingestion, cleansing, and enrichment to enhance record content with additional relevant information. | Apache Kafka for data ingestion Pandas, NumPy for data processing Elasticsearch |
| AI-Based Record Analysis, Benchmarking, and Recommendation | Uses AI to classify records, benchmark them against the "Perfect Ad" standard, and provide personalized improvement suggestions. | TensorFlow or PyTorch for AI models Scikit-learn for classification |
| Ranking and Optimization Engine | Manages revcord ranking and continuous optimization based on performance metrics within a unified feedback loop. | XGBoost or LightGBM for ranking algorithms Elasticsearch with LTR plugin Optimizely for A/B testing |
| API Gateway & Data Validation | Provides secure API interactions and validates data integrity across the system. | Kong API Gateway or NGINX for API management FastAPI for APIs JSON Schema for data validation |

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of applying an automated filtering tool for authenticating server publishing actions for providing cybersecurity to users accessing web records, comprising:

monitoring for an attempt by a server to publish a target web accessible record thereon for being accessible via the world wide web (WWW);

analyzing a set of previously published web accessible records to determine, for each, a fraud probability score;

selecting from the set of previously published web accessible records a record having the lowest fraud probability score in said set, and designating said selected record as a template web accessible record;

feeding the template web accessible record and the target web accessible record into a machine learning model;

obtaining from the machine learning model, an indication of a statistical correlation between features of the template web accessible record and features of the target web accessible record;

blocking the server from publishing the target web accessible record thereon for being accessible via the WWW when the indication indicates that the target web accessible record is fraudulent and/or posing a cybersecurity risk, or instructing the server to publish the target web accessible record thereon to be accessible via the WWW when the indication indicates that the target web accessible record is non-fraudulent and/or not posing the cybersecurity risk; and dynamically adapting the template web accessible record in real-time by:
(i) periodically analyzing newly published web accessible records for updated fraud probability scores,
(ii) applying a ranking process selected from: quality, relevance, keyword optimization, user engagement, and compliance with guidelines, and
(iii) selecting a new template record with the lowest fraud probability score from the updated ranked set;

wherein the updated template web accessible record is fed into the machine learning model with the target web accessible record.

2. The computer implemented method of claim 1, further comprising:
identifying at least one feature of the target web accessible record for which the statistical correlation with a corresponding at least one feature of the template web accessible record is below a threshold; and
generating a recommendation for adapting the at least one feature of the target web accessible record for increasing the statistical correlation with the corresponding at least one feature of the template web accessible record above the threshold.

3. The computer implemented method of claim 1, wherein the template web accessible record is at least one of the following relative to the set of existing web accessible records published by the server: most likely to be viewed, most likely to be interacted with by users, most likely to be acted upon by users, highest click-through rate, longest time spent being viewed by users, and highest conversion rate.

4. The computer implemented method of claim 1, wherein the template web accessible record is generated by analyzing the set of web accessible records posted to the server, as an aggregate of the set of web accessible records representing variability in fraudulency and/or security risk.

5. The computer implemented method of claim 1, further comprising:
identifying a type of the target web accessible record; and
selecting the template web accessible record corresponding to the type from a plurality of template web accessible records of different types.

6. The computer implemented method of claim 1, further comprising:
collecting metadata from a computing device used to provide the target web accessible record;
associating the metadata with the target web accessible record,
wherein feeding comprises feeding the target web accessible record and the associated metadata,
wherein the statistical correlation is computed for the metadata of the target web accessible record and the metadata of the template web accessible record,
wherein the target web accessible record is removed when the metadata collected from the computing device represents likelihood of the target web accessible record being fraudulent and/or posing a cybersecurity risk.

7. The computer implemented method of claim 6, wherein the metadata includes at least one of: device type, hardware data, operating system and/or version, browser type and/or version, screen resolution, network information, IP address, Internet Service Provider (ISP), network connection type, geographical location data, user account information, upload details, file size and/or type of uploaded content, image metadata, application-specific data, interaction data, and previous listing history.

8. The computer implemented method of claim 1, further comprising:
accessing an external dataset for obtaining ownership data indicating ownership of an object listed in the target web accessible record;
associating the ownership data with the target web accessible record,
wherein feeding comprises feeding the target web accessible record and the associated ownership data,
wherein the statistical correlation is computed for the ownership data of the target web accessible record and the ownership data of the template web accessible record, wherein the target web accessible record is removed when the ownership data represents likelihood of the target web accessible record being fraudulent and/or posing a cybersecurity risk.

9. The computer implemented method of claim 1, further comprising:
computing a first similarity metric indicating maximal non-similarity between the template web accessible record and other sample web accessible records of the server;
computing a second similarity metric indicating similarity between the target web accessible record and sample web accessible records of the server;
wherein the statistical correlation is computed between the first similarity metric and the second similarity metric;
wherein the target web accessible record is removed when the statistical correlation indicates likelihood of the target web accessible record being fraudulent and/or posing a cybersecurity risk due to high similarity to at least one sample web accessible record.

10. The computer implemented method of claim 1, further comprising:
in response to the indication meeting a requirement indicating inaccurate and/or missing information, identifying the inaccurate and/or missing information in the target web accessible record leading to the indication;
automatically correlating the inaccurate and/or missing information to an external dataset;
extracting correlated data from the external dataset;
automatically correcting the inaccurate and/or missing information; and
re-feeding the corrected target web accessible record into the machine learning model.

11. The computer implemented method of claim 1, further comprising:
evaluating the indication relative to a quality threshold indicating a quality threshold to identify reduced quality of the target web accessible record,
identifying the features of the target web accessible record leading to the reduced quality;
automatically correlating the features to increase quality; and
automatically re-feeding the corrected target web accessible record into the machine learning model to determine whether quality of the corrected target web accessible record is above the quality threshold.

12. The computer implemented method of claim 1, further comprising monitoring for an adaptation of the target web accessible record, and in response to the monitoring, feeding the adapted target web accessible record into the machine learning model.

13. The computer implemented method of claim 1, wherein the target web accessible record is of a real estate property for sale and/or rent, and the fraudulent and/or cybersecurity risk is of at least one of: the target web accessible record actually being for a real estate property that is different than the real estate property listed in the target web accessible record, the target web accessible record is of a sample real estate property listed in another sample web accessible record on the same server, the real estate property is owned by a different person than the person that is listed as the owner in the target web accessible record, and the target web accessible record indicates a sale by owner while a contact listed on the record is a real estate agent.

14. The computer implemented method of claim 1, wherein the features of the template web accessible record and features of the target web accessible record include parameters indicating quality of images.

15. The computer implemented method of claim 14, wherein the parameters indicating quality of images are selected from: image resolution, image size, blurriness, cluster from background objects different than the object associated with the web accessible record, sufficient number of images to cover views of the object.

16. The computer implemented method of claim 1, wherein the features of the template web accessible record and features of the target web accessible record include parameters indicating quality of text content.

17. The computer implemented method of claim 16, wherein the parameters indicating quality of context are selected from: correct spelling, correct grammar, sufficient description, vocabulary, and ability to be understood by an average person.

18. The computer implemented method of claim 1, wherein the template web accessible record is automatically created, evaluated by a ranking process, and automatically adapted to be the highest ranked web accessible record from other sample web accessible records presented on the server.

19. The computer implemented method of claim 1, wherein the features of the template web accessible record and features of the target web accessible record include compliance with guidelines.

20. The computer implemented method of claim 1, wherein the target web accessible record is removed when the indication is below a threshold indicating that the target web accessible record is fraudulent and/or posing a cybersecurity risk, or posting the target web accessible record to the server when the indication is above the threshold.

21. A system for cybersecurity for applying an automated filtering tool for authenticating server publishing actions for providing cybersecurity to users accessing web records, comprising:
at least one processor executing a code for:
monitoring for an attempt by a server to publish a target web accessible record thereon for being accessible via the world wide web (WWW);
analyzing a set of previously published web accessible records to determine, for each, a fraud probability score;
selecting from the set of previously published web accessible records a record having the lowest fraud probability score in said set, and designating said selected record as a template web accessible record;
feeding the template web accessible record and the target web accessible record into a machine learning model;
obtaining from the machine learning model, an indication of a statistical correlation between features of the template web accessible record and features of the target web accessible record;
blocking the server from publishing the target web accessible record thereon for being accessible via the WWW when the indication indicates that the target web accessible record is fraudulent and/or posing a cybersecurity risk, or
instructing the server to publish the target web accessible record thereon to be accessible via the WWW when the indication indicates that the target web accessible record is non-fraudulent and/or not posing the cybersecurity risk; and
dynamically adapting the template web accessible record in real-time by:
(i) periodically analyzing newly published web accessible records for updated fraud probability scores,
(ii) applying a ranking process selected from: quality, relevance, keyword optimization, user engagement, and compliance with guidelines, and
(iii) selecting a new template record with the lowest fraud probability score from the updated ranked set;
wherein the updated template web accessible record is fed into the machine learning model with the target web accessible record.

22. A non-transitory medium storing program instructions for applying an automated filtering tool for authenticating server publishing actions for providing cybersecurity to users accessing web records, comprising program instructions which when executed by at least one processor, cause the at least one processor to:
monitor for an attempt by a server to publish a target web accessible record thereon for being accessible via the world wide web (WWW);
analyze a set of previously published web accessible records to determine, for each, a fraud probability score;
select from the set of previously published web accessible records a record having the lowest fraud probability score in said set, and designating said selected record as a template web accessible record;
feed the template web accessible record and the target web accessible record into a machine learning model;
obtain from the machine learning model, an indication of a statistical correlation between features of the template web accessible record and features of the target web accessible record;
block the server from publishing the target web accessible record thereon for being accessible via the WWW when the indication indicates that the target web accessible record is fraudulent and/or posing a cybersecurity risk, or
instruct the server to publish the target web accessible record thereon to be accessible via the WWW when the indication indicates that the target web accessible record is non-fraudulent and/or not posing the cybersecurity risk; and
dynamically adapting the template web accessible record in real-time by:
(i) periodically analyzing newly published web accessible records for updated fraud probability scores,
(ii) applying a ranking process selected from: quality, relevance, keyword optimization, user engagement, and compliance with guidelines, and
(iii) selecting a new template record with the lowest fraud probability score from the updated ranked set;
wherein the updated template web accessible record is fed into the machine learning model with the target web accessible record.

23. The computer implemented method of claim 1, wherein said machine learning model is trained on analyzing the template web accessible record with respect to the target web accessible record, where the training is on the analysis, rather than on the template record.

* * * * *